US012269149B2

(12) United States Patent
Sellman et al.

(10) Patent No.: US 12,269,149 B2
(45) Date of Patent: Apr. 8, 2025

(54) ENGINE COMPONENT REMOVAL TOOL

(71) Applicant: BNSF Railway Company, Fort Worth, TX (US)

(72) Inventors: Chad T. Sellman, Oak Grove, MN (US); Jason E. Carlson, Chisago City, MN (US); James J. Rumpca, White Bear Township, MN (US)

(73) Assignee: BNSF Railway Company, Fort Worth, TX (US)

(*) Notice: Subject to any disclaimer, the term of this patent is extended or adjusted under 35 U.S.C. 154(b) by 0 days.

(21) Appl. No.: 18/159,468

(22) Filed: Jan. 25, 2023

(65) Prior Publication Data

US 2024/0246208 A1 Jul. 25, 2024

(51) Int. Cl.
*B25B 27/14* (2006.01)
*F02M 61/14* (2006.01)

(52) U.S. Cl.
CPC ............. *B25B 27/14* (2013.01); *F02M 61/14* (2013.01)

(58) Field of Classification Search
CPC ... B25B 27/14; B25B 27/0035; B25B 27/023; F02M 61/14; Y10T 29/53848
USPC ........................................................... 29/256
See application file for complete search history.

(56) References Cited

U.S. PATENT DOCUMENTS 4,065,941 A * 1/1978 Aoki ........................ F16D 3/207 464/115
4,293,992 A * 10/1981 Webb ..................... B25B 27/023 29/267
6,629,349 B2 10/2003 King
8,490,263 B2 7/2013 Whitaker
8,707,556 B2 4/2014 Imam et al.
10,415,525 B2 9/2019 Del Rossa
(Continued)

FOREIGN PATENT DOCUMENTS

CN 105291042 A 2/2016
CN 210650504 U 6/2020
CN 213290106 U 5/2021
(Continued)

OTHER PUBLICATIONS

Injectors Direct, 6.7 Powerstroke Injector Removal Tool _ InjectorsDirect, Dec. 31, 2021.

*Primary Examiner* — Eric J Rosen
*Assistant Examiner* — Robert C Moore
(74) *Attorney, Agent, or Firm* — Whitaker Chalk Swindle & Schwartz PLLC; Enrique Sanchez, Jr.; Juan Vasquez

(57) ABSTRACT

A removal tool configured for removing an insertable engine component from an engine assembly. In the removal tool may include a coupling device, a drive member, and a lifting member attached to a main shaft. The coupling device is mounted onto a retainer securing an engine component, and the lifting member is positioned against the underside of a flange of the engine component. A rotational force applied against the drive member is transferred to the coupling device and causes the retainer to be unscrewed. As the retainer is unscrewed, this causes a lifting force from the retainer pushing against the coupling device, which causes the lifting member to be pushed upward, and further causing the engine component to be pushed upward and away from the engine assembly. This facilitates removal of the engine component concurrently with the removal of the retainer (e.g., in a single operation).

17 Claims, 10 Drawing Sheets

(56) References Cited

U.S. PATENT DOCUMENTS

| | | | | |
|---|---|---|---|---|
| 2007/0000113 | A1 | 1/2007 | Desilets | |
| 2013/0263704 | A1* | 10/2013 | Chen | B25B 27/0035 81/177.5 |

FOREIGN PATENT DOCUMENTS

| | | | |
|---|---|---|---|
| DE | 10344622 | A | 4/2005 |
| EP | 1884657 | A1 | 2/2008 |

* cited by examiner

ENGINE COMPONENT REMOVAL TOOL

TECHNICAL FIELD

The present disclosure relates generally to maintenance tools, and more particularly to a tool assembly for removing component.

BACKGROUND

Engines are very useful machines that allow us to power other useful machines. For example, locomotive engines allow us to move train cars that may carry various types of cargo over long distances. These engines, however, like all machines may break down, requiring maintenance, or may require regular maintenance to keep them in good working order. In particular cases, some engine components are installed onto an engine by inserting them into a slot, cavity, or chamber. In these cases, performing maintenance on these components may require uninstalling these components, which may include pulling or extracting these components from their slot. For example, some engines include fuel injector assemblies. These fuel injector assemblies may include a fuel injector that is typically installed onto the engine by inserting the fuel injector into a slot (e.g., a cylinder head). Typically, the fuel injector is retained in position using a retainer bolt or screw. In most cases, a hold-down clamp is used and then secured by a clamp bolt or screw. Indeed, most of these engine components that are inserted into a respective slot are secured onto the engine using at least a retaining bolt or screw.

Typically, removing an insertable engine component (e.g., a component that is inserted into a chamber, slot, or cavity in the engine, such as a fuel injector), includes removing the retainer bolt or screw (e.g., a clamp bolt or screw where a hold-down clamp is used), removing the hold-down claim if one is used, and then removing the insertable engine component from the slot. Most often, the insertable engine component is removed from the slot by a pulling force. For example, the operator may use force to extract the insertable engine component from the slot, such as by grabbing onto the insertable engine component and pulling away from the slot. However, this process may be dangerous as it may cause damage to the engine and/or the insertable engine component if too much force is used, if the application of the pulling force is not even, and/or simply by the grabbing of the insertable engine component. In addition, in some cases, such as when removing a fuel injector, getting to the retaining bolt may be difficult due to the location of the retaining bolt and/or due to the limited available space for maneuvering around the retaining bolt.

In some cases, such as in the case of fuel injectors, the force necessary to extract the fuel injector may substantial. However, due to the location of the fuel injectors relative to other engine components, applying the necessary leverage to extract the fuel injector from its slot may be challenging. The consequences of not applying the correct leverage in the correct manner when extracting a fuel injector may be severe. For example, not applying the correct leverage in the correct manner when extracting a fuel injector may cause slippage of the tool being used to extract the fuel injector, which may cause damage to the fuel injector, other engine components, or may cause the operator's loss of balance. In some cases, not applying the correct leverage in the correct manner when extracting a fuel injector may cause a "line of fire release." A line of fire release may occur when combustible mixture under very high compression pressure within a cylinder is suddenly released as the fuel injector is removed, which may lead to possible injury to maintenance personnel and/or damage to equipment.

Some fuel injector removal tools have been proposed, but these removal tools are often complex, difficult to use, and/or require removal of the retaining bolt, which as mentioned above can be difficult. As such, these removal tools are not robust enough to address the problems mentioned above.

SUMMARY

The present disclosure achieves technical advantages as a removal tool configured for removing an insertable engine component from an engine assembly. In embodiments, the removal tool may include a main shaft having a distal end, an intermediate section, and a proximate end. The removal tool may include a lifting member disposed within the intermediate area, a coupling device attached to the distal end, and a drive member attached to the proximate end.

In embodiments, the removal tool may be configured to translate a rotational (e.g., twisting) force applied against the main shaft into a lifting force that is applied against the insertable engine component causing the insertable engine component to be extracted from the engine slot. For example, in embodiments, the coupling device may be configured to be mounted onto a retaining component (e.g., a bolt, screw, or any other type of fastener or retainer) securing the insertable engine component, or a hold-down clamp securing the insertable engine component onto the engine frame. In embodiments, the drive member may be configured to receive a rotational force (e.g., by an operator and/or a tool) and transfer the rotational force onto the main shaft. In embodiments, the lifting member may be configured to be engaged with at least a portion of the insertable engine component (e.g., a flange, a socket, a cavity, a protuberance, etc.). The engagement between the at least a portion of the insertable engine component and the lifting member may be such that a lifting force applied against the main shaft is transferred through the lifting member onto the portion of the insertable engine component causing the insertable engine component to be separated or extracted from the slot into which the insertable engine component is installed. For example, the coupling device may be configured to, upon application of the rotational force against the main shaft (e.g., via the drive member), cause the retaining component to rotate and become unscrewed from a threaded bore into which the retaining component may be installed. As the retaining component becomes unscrewed from the threaded bore, this action causes the main shaft to move vertically as the retaining component separates away from the threaded bore. The vertical movement of the main shaft includes the lifting force that is transferred through the lifting component onto the insertable engine component, causing the insertable engine component to be extracted or pulled from the slot into which the insertable engine component is installed. In this manner, the removal tool may be configured to facilitate removal of the insertable engine component from the engine frame concurrently with the removal of the retaining component (e.g., in a single operation).

In some embodiments, the removal tool implemented in accordance with the present disclosure may provide a solution to the current issues with removal of insertable engine components from engines, as described above. For example, a removal tool implemented in accordance with embodiments of the present disclosure may allow removal of an insertable engine component (e.g., a fuel injector of a locomotive engine) in which the retaining component (e.g., a retaining bolt securing the fuel injector to the engine frame, or a clamp bolt securing a hold-down clamp that secures the fuel injector to the engine frame) may be removed concurrently with the extraction of the insertable engine component from the slot (e.g., a slot or seat in a cylinder head) of the insertable engine component. In this manner, the removal tool of embodiments may allow the operation to remove the retaining component to also operate to extract the insertable engine component from the slot of the insertable engine component. Due to the configuration of the removal tool of embodiments, the lifting force applied to the insertable engine component may be applied evenly and appropriately, mitigating the risk that too much force may be used to remove the insertable engine component, which may cause problems (e.g., damage or injury) as described above. Moreover, the configuration of the removal tool of embodiments may allow the operator to remove the insertable engine component without having to reach down into an awkward location, and/or with a better body position, as the tool may provide the leverage and the operator may simply apply the rotational force at the drive member to remove the insertable engine component (e.g., to concurrently loosen the retaining component and extract the insertable engine component). For example, in a particular embodiments, removing a fuel injector from an engine may be performed using a removal tool in accordance with the present disclosure by using a single handle driver (e.g., a flex handle, a ratchet handle of a socket wrench, an impact wrench, etc.) to apply a rotational force against the drive member (which may be converted into lifting force that may extract the fuel injector from its seat in the cylinder head).

In some embodiments, the present disclosure provides a fuel injector removal tool that enables both (i) loosening and removing the fuel injector clamp bolt, and (ii) withdrawing the fuel injector from the cylinder head in one step, e.g., in a single operation. This is important because with conventional tools the injector hold-down or clamp bolt must be removed first before the fuel injector can be withdrawn from its seat in the cylinder head. Without the present invention this step requires reaching downward to a location that can be awkward using a separate hand wrench. In some circumstances, it is difficult to apply the correct force smoothly because of limited access to the location of the clamp bolt. Further, the fuel injector tool described herein mitigates the chance of over exertion by allowing for a better body position of the mechanic and letting the tool adapted specifically for the simultaneous loosening and withdrawing process do the work. Moreover, the use of this removal tool prevents the chance of “line of fire” release of energy from the engine cylinder as well as “pinch point” problems. Pinch point problems can arise when a mechanic’s hands are trapped between a wrench lever or pry bar while trying to maintain alignment of the tool, for example. Once the clamp bolt is removed, some means for grasping the fuel injector body must be provided. Without a special tool adapted to the body of the fuel injector this operation can be difficult with possible risk of damage to the fuel injector.

In one embodiment, a removal tool for removing an insertable engine component from a slot of an engine frame is provided. The removal tool includes a main shaft having a distal end, a proximate end, and an intermediate region disposed within the distal end and the proximate end. The removal tool also includes a coupling device coupled to the distal end of the main shaft. In embodiments, the coupling device may be configured to be mounted around a retaining component securing the insertable engine component to the engine frame. The removal tool further includes a drive member coupled to the proximal end of the main shaft. In embodiments, the drive member may be configured to receive a rotational force. The removal tool also includes a lifting member (e.g., plate, rod, component, etc., configured to have an open end to receive a component while engaging the component on at least two points) coupled to the intermediate region of the main shaft. In embodiments, the lifting member may be configured to be positioned against at least a portion of an underside of the insertable engine component. In embodiments, the main shaft may be configured to transfer the rotational force from the drive member to the coupling device causing the coupling device to rotate about a longitudinal axis of the main shaft, the rotation of the coupling device may cause the retaining component to be loosened and to separate from a bore into which the retaining component is installed away from the bore in a vertical direction away from the distal end of the main shaft, and the lifting member may be configured to transfer the vertical force as a lifting force onto the at least a portion of an underside of the insertable engine component, causing the insertable engine component to be lifted out of the slot of the engine frame. In embodiments, the main shaft can be configured to transfer the rotational force from the drive member to the coupling device causing the coupling device to rotate about a longitudinal axis of the main shaft to lift the insertable engine component out of an engine.

In another embodiment, a method of removing an insertable engine component from a slot of an engine frame is provided. The method includes mounting a coupling device attached to a distal end of a main shaft of a removal tool around a retaining component securing the insertable engine component to the engine frame, and positioning a lifting member attached to an intermediate section of the main shaft of the removal tool around the insertable engine component. In embodiments, the lifting member may be positioned against at least a portion of an underside of the insertable engine component. The method also includes applying a rotational force against a drive member attached to a proximate end of the main shaft of the removal tool. In embodiments, the rotational force may be transferred from the drive member to the coupling device through the main shaft causing the coupling device to rotate about a longitudinal axis of the main shaft, the rotation of the coupling device may cause the retaining component to be loosened and to separate from a bore into which the retaining component is installed away from the bore in a vertical direction away from the distal end of the main shaft, and the vertical force may be transferred by the lifting member as a lifting force onto the at least a portion of an underside of the insertable engine component, causing the insertable engine component to be lifted out of the slot of the engine frame.

In another embodiment, a method of manufacturing a removal tool for removing an insertable engine component from a slot of an engine frame is provided. The method includes disposing a coupling device onto a distal end of a main shaft of the removal tool. In embodiments, the coupling device is configured to be mounted around a retaining component securing the insertable engine component to the engine frame. The method also includes disposing a drive member onto a proximal end of the main shaft of the removal tool. In embodiments, the drive member is configured to receive a rotational force. The method also includes disposing a lifting member onto an intermediate region of the main shaft, the intermediate region disposed within the distal end and the proximate end. In embodiments, the lifting member is configured to be positioned against at least a portion of an underside of the insertable engine component. In embodiments, the main shaft may be configured to transfer the rotational force from the drive member to the coupling device causing the coupling device to rotate about a longitudinal axis of the main shaft, the rotation of the coupling device may cause the retaining component to be loosened and to separate from a bore into which the retaining component is installed away from the bore in a vertical direction away from the distal end of the main shaft, and the lifting member may be configured to transfer the vertical force as a lifting force onto the at least a portion of an underside of the insertable engine component, causing the insertable engine component to be lifted out of the slot of the engine frame.

In another embodiment, an engine component removal tool can include: a main shaft having a first and second end; a coupling device coupled to a first end of the main shaft, wherein the coupling device is configured to releasably engage a retaining component operably coupled to an engine frame; a lifting member coupled to a portion of the main shaft, wherein the lifting member is configured to receive at least a portion of an insertable engine component; a drive member coupled to the proximal end of the main shaft, wherein the drive member is configured to receive a rotational force to withdraw the retaining component from the engine frame while withdrawing the insertable engine component from an engine. Wherein the insertable engine component includes a fuel injector installed in a cylinder head of a locomotive engine. Wherein the main shaft is of a unitary construction. Wherein the main shaft is composed of separate components, wherein the separate components include an upper section and a lower section. Wherein the upper section includes the drive member and a distal end configured to be coupled to a proximate end of the lower section.

In another embodiment, an apparatus for removing a fuel injector from a diesel engine can include: a ball and socket universal joint coupled between a wrench socket and an extension shaft configured with a circular flange formed perpendicular to the extension shaft around the end opposite the universal joint and having a first square drive mortise disposed in the center of the circular flange; an adapter shaft configured with a square drive tenon lower end for coupling into the first square drive mortise of the circular flange and a second square drive mortise formed in the end opposite the lower end of the adapter shaft; and a lifting member having a hole disposed near a base edge and first and second substantially parallel arms extending from the base edge, wherein the adapter shaft can be received through the hole in the lifting member and the tenon of the lower end of the adapter plate can be inserted into the first square drive mortise of the circular flange.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Figure 1:
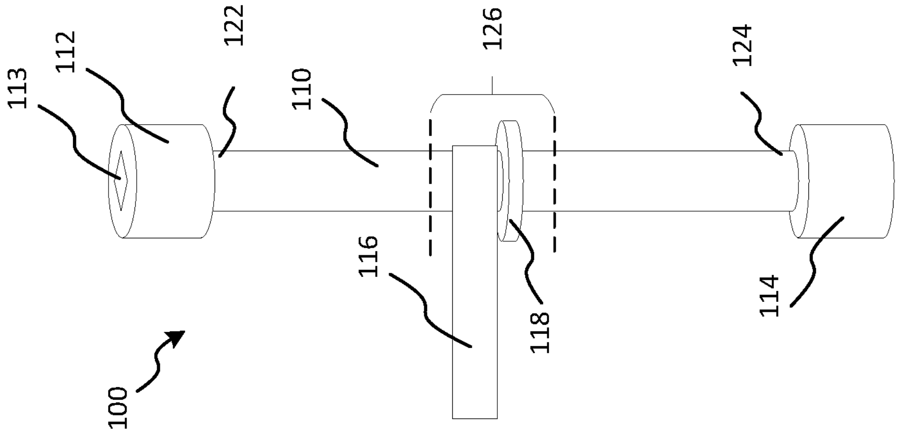
FIG. 1 shows an exemplary removal tool configured with capabilities and functionality for removing an insertable engine component from a slot of an engine assembly in accordance with embodiments of the present disclosure.

Various embodiments of the present disclosure are directed to a removal tool configured for removing an insertable engine component from a slot of an engine assembly. FIG. 1 shows an exemplary removal tool 100 configured with capabilities and functionality for removing an insertable engine component from a slot of an engine assembly in accordance with embodiments of the present disclosure. As shown in FIG. 1, removal tool 100 may include main shaft 110, coupling device 114, drive member 112, and lifting member 116. In embodiments, the various components of removal tool 100 may be configured to provide functionality, such as by the cooperative operation of the various components of removal tool 100, to remove an insertable engine component from a slot of an engine assembly, as described in various embodiments of the present disclosure.

In embodiments, main shaft 110 may be configured to provide structural support for removal tool 100, such as by providing functionality for attaching the various component for removal tool 100. For example, main shaft 110 may have a distal end 124 and a proximate end 122. In embodiments, main shaft 110 may include an intermediate section 126 at some portion or region between distal end 124 and proximate end 122.

In embodiments, distal end 124 may be configured to provide an attachment point for coupling device 114. For example, coupling device 114 may be attached to distal end 124. In embodiments, coupling device 114 and distal end 124 may represent a unitary construction, such that coupling device 114 is integrated with distal end 122. In alternative embodiments, coupling device 114 and distal end 124 may be of separate construction, such that coupling device 114 is a separate component from distal end 124 (e.g., a separate component from main shaft 110). In this case, coupling device 114 may be coupled to distal end 124 by inserting, fastening, attaching, or otherwise coupling coupling device 114 to distal end 124. For example, in some embodiments, distal end 124 may include a tenon (e.g., a square, rectangular, or other suitable shape) configured to attach to a mortise of coupling device 114. In this example, coupling device 114 may be coupled to distal end 124 by inserting the tenon of distal end 124 into the mortise of coupling device 114. In alternative embodiments, coupling device 114 may include the tenon and distal end 124 may include the mortise.

In embodiments, proximate end 122 may be configured to provide an attachment point for drive member 112. For example, drive member 112 may be attached to proximate end 122. In embodiments, drive member 112 and proximate end 122 may represent a unitary construction, such that drive member 112 is integrated with proximate end 122. In alternative embodiments, drive member 112 and proximate end 122 may be of separate construction, such that drive member 112 is a separate component from proximate end 122 (e.g., a separate component from main shaft 110). In this case, drive member 112 may be coupled to proximate end 122 by inserting, fastening, attaching, or otherwise coupling drive member 112 to proximate end 122. For example, in some embodiments, proximate end 122 may include a tenon (e.g., a square, rectangular, or other suitable shape) configured to attach to a mortise of drive member 112. In this example, drive member 112 may be coupled to proximate end 122 by inserting the tenon of proximate end 122 into the mortise of drive member 112. In alternative embodiments, drive member 112 may include the tenon and proximate end 122 may include the mortise.

In embodiments, intermediate section 126 may be configured to provide an attachment point for lifting member 116. For example, in embodiments, lifting member 116 may be attached to intermediate section 126 of main shaft 110. In some embodiments, lifting member 116 may be attached to intermediate section 126 in a semi-fixedly manner. For example, intermediate section 126 may include detent member 118 configured to arrest or resist the vertical movement of lifting member along a single direction (e.g., a direction toward distal end 124), while allowing vertical movement of lifting member 116 in the opposite direction (e.g., in the direction toward proximate end 122). In embodiments, the configuration of intermediate section 126 may allow lifting member to be slid into position (e.g., under a portion of the insertable engine component to be removed), while positioning the lifting member in place. In addition, the configuration of intermediate section 126 may allow lifting member 116 to transfer a vertical movement of main shaft 110 as a vertical force onto the insertable engine component to be removed, such as by causing detent member 118 to "push" lifting member 116 against the insertable engine component to "push" the insertable engine component in the direction of the lifting force to extract the insertable engine component from the slot in the engine frame into which the insertable engine component may be installed.

In some embodiments, detent member 118 may be configured to have an adjustable position long the longitudinal axis of main shaft 110. For example, in some embodiments, detent member 118 may thread around main shaft 110, and may be moved along longitudinal axis of main shaft 110 by rotating detent member 118. In this manner, detent member 118 may be adjusted up and down. This functionality of detent member 118 may be leveraged during operation of removal tool 100 to allow removal tool 100 to be positioned in place with sufficient maneuvering space, and to then adjust the lifting member under the insertable engine component to be removed (e.g., a portion of the insertable engine component, such as a flange or other protrusion providing a surface for lifting member 116 to push against) by moving detent member 118 against the insertable engine component.

In some embodiments, main shaft 110 may be constructed of a unitary construction. In alternative embodiments, main shaft may be constructed, or assembled, from a combination of various components. For example, main shaft 110 may include a plurality of portions that may be assembled together to form main shaft 110. In a particular example, main shaft 110 may include an upper portion and a lower portion. In this example, a distal end of the upper portion may be coupled to the proximate end of the lower portion to form main shaft 110. In some embodiments, the upper portion may be coupled to the lower portion using a tenon and mortise system as described herein. In embodiments, this non-unitary construction of main shaft 110 may allow an embodiment in which the upper portion of main shaft 110 may be inserted through an opening of lifting member 116 to be attached to the lower portion of main shaft 110. This may be leveraged during operation to place the lower portion of main shaft 110 including the coupling device 114 onto the retaining component of the insertable engine component to be removed, to then place the lifting member 116 under the insertable engine component, and to then insert the upper portion of main shaft 110 (e.g., including drive member 112) through the opening of lifting member 116 to be attached to the lower portion of main shaft 110.

In embodiments, main shaft 110 may be configured to route various forces during operation of removal tool 100 to facilitate removal of an insertable engine component. As will be described in more detail below, main shaft 110 may be configured to transfer a rotational force (e.g., a rotational force applied via drive member 112) onto coupling device 114. The rotational force may cause a retaining component (e.g., a retaining component over which coupling device 114 may be mounted) to rotate and become unscrewed and separate from a threaded bore into which the retaining component may be installed. As the retaining component becomes unscrewed from the threaded bore, main shaft is pushed in a vertical direction in the upward direction (e.g., away from distal end 124). The vertical movement of main shaft 110 transfers a lifting force (in the same upward direction) onto and through lifting component 116, which may then be transferred onto the insertable engine component, causing the insertable engine component to be pushed upwards away from the slot into which the insertable engine component may be installed. In this manner, main shaft 110 may be configured to convert a rotational force into a lifting force that is applied onto the insertable engine component. It is noted that, in embodiments, the extraction of the insertable engine component from the slot in the engine frame occurs concurrently with the removal of the retaining component (e.g., in a single operation).

Drive member 112 may be configured to receive a rotational force and to transfer the rotation force through main shaft 110 onto coupling device 114. In embodiments, the rotational force may represent a twisting or rotational force applied by an operator performing removal of the insertable engine component. In some embodiments, the rotational force may be applied to drive member 112 via a tool. The tool used to apply the rotational force onto drive member 112 may include a ratchet, a driver, a wrench, an impact wrench, a screwdriver, and/or any other tool configured to provide a rotational force, either powered or manual. In embodiments, drive member 112 may include a member to receive the rotational force. For example, drive member 112 may include a mortise 113 that may be used to cause drive member 112 to rotate upon application of the rotational force. In embodiments, a tool may be attached to drive member 112 via mortise 113 to apply the rotational force.

In embodiments, as described above, drive member 112 may be coupled or attached to proximate end 122 of main shaft 110. The rotational force received by drive member 112 may be transferred through main shaft 110 onto coupling device 114 via the coupling between drive member 112 and proximate end 122. In embodiments, the coupling between drive member 112 and proximate end 122 may include a tenon and mortise system as described above, which may operate to transfer the rotational force received by drive member 112 through main shaft 110 onto coupling device 114.

In embodiments, drive member 112 may be made of any material suitable to withstand application of substantial rotational force. For example, drive member 112 may be made of steel, iron, high-strength carbon, etc., and/or may be rated up to use with an impact wrench.

Coupling device 114 may be configured to receive a rotational force transferred from drive member 112 through main shaft 110 onto a retaining component (e.g., a bolt, a screw, etc.) securing the insertable engine component, or a hold-down clamp, against the engine frame. In embodiments, coupling device 114 may be configured to be mounted onto the retaining component in a rotationally fixed manner. For example, coupling device 114 may be configured to securely or tightly grip the retaining component such that when coupling device 114 is rotated (e.g., via the rotational force transferred via main shaft 110), the retaining component is also rotated. In embodiments, coupling device 114 may include a socket, a wrench, and/or any other device configured to securely grip the retaining component and cause it to rotate when coupling device 114 is rotated. In particular embodiments, coupling device 114 may include a ball and socket joint having a wrench socket that may be configured to mount onto the retaining component.

In embodiments, coupling device 114 may be configured to receive a vertical force from the retaining component that may cause coupling device 114 to be pushed in a direction away from distal end 124. For example, as the rotational force is applied by coupling device 114 onto the retaining component, the retaining component may rotate and become unscrewed and separate from the threaded bore into which the retaining component may be installed. As the retaining component is unscrewed, the coupling device 114 is pushed "up" away from distal end 124 into the direction of intermediate section 126 by the vertical upward movement of the retaining component. The vertical force from the retaining component may then be transferred by coupling device 114 through the main shaft onto lifting component 116. For example, as described above, coupling device 114 may be coupled or attached to distal end 124 of main shaft 110. The vertical force received from the retaining component (e.g., the upward separation from the retaining component from the threaded bore into which the retaining component may be installed as the retaining component is unscrewed from the threaded bore) by coupling device 114 may be transferred through main shaft 110 onto lifting member 116 via the coupling between coupling device 114 and distal end 124. In embodiments, the coupling between coupling device 114 and distal end 124 may include a tenon and mortise system as described above, which may operate to transfer the vertical force received by coupling device 114 through main shaft 110 onto lifting member 116.

In embodiments, coupling device 114 may be made of any material suitable to withstand application of substantial rotational and/or vertical force. For example, coupling device 114 may be made of steel, iron, high-strength carbon, etc., and/or may be rated up to use with an impact wrench.

Lifting member 116 may be configured to receive a vertical force from coupling device 114 through main shaft 110 and to transfer the vertical force as a lifting force onto at least a portion of the insertable engine component to be removed. For example, in embodiments, lifting member 116 may be configured to engage with at least a portion of the insertable engine component. In embodiments, the at least a portion of the insertable engine component may include a flange, a socket, a cavity, a protuberance, etc. of the insertable engine component. In these embodiments, lifting member 116 may be configured to engage with the at least a portion of the insertable engine component in such a manner as to "push" the insertable engine component in the direction of the lifting force. For example, lifting member 116 may be positioned against a flange of the insertable engine component, such as the underside of the flange. In this example, lifting member 116 may receive the vertical force from coupling device 114 through main shaft 110. In particular, the upward movement in the direction of the vertical force by main shaft 110 may move detent member 118 in the vertical force direction. This movement may cause detent member 118 to push against lifting member 116 and may push lifting member in the direction of the vertical force. This may create the lifting force through lifting member 116. Lifting member 116 may apply the lifting force against the flange, pushing against the flange and pushing the insertable engine component in the direction of the lifting force and causing the insertable engine component to be moved in the upward direction (e.g., the direction of the vertical force). In this manner, the insertable engine component may be pushed by lifting member 116 in the direction of the vertical force. This lifting force may cause the insertable engine component to separate or be pulled or extracted from the slot into which the insertable engine component may be installed.

In embodiments, lifting member 116 may be free to rotate about main shaft 110. For example, lifting member 116 may include an opening (not shown in FIG. 1). The opening of lifting member 116 may be configured to allow main shaft 110 to slide into the opening, such that lifting member 116 may be allowed to move along the longitudinal axis of main shaft 110. In this manner, as main shaft 110 rotates about its longitudinal axis (e.g., in response to the application of the rotational force via drive member 112), lifting member 116 may not rotate along with main shaft 110 and may instead remain in place with respect to the insertable engine component. Put another way, main shaft 110 may rotate within the opening of lifting member 116, but lifting member may stay in position with respect to the insertable engine component. This functionality allows the application of the rotational force to be translated into the lifting force by the cooperative operation of the components of removal tool 100.

Figure 2A:
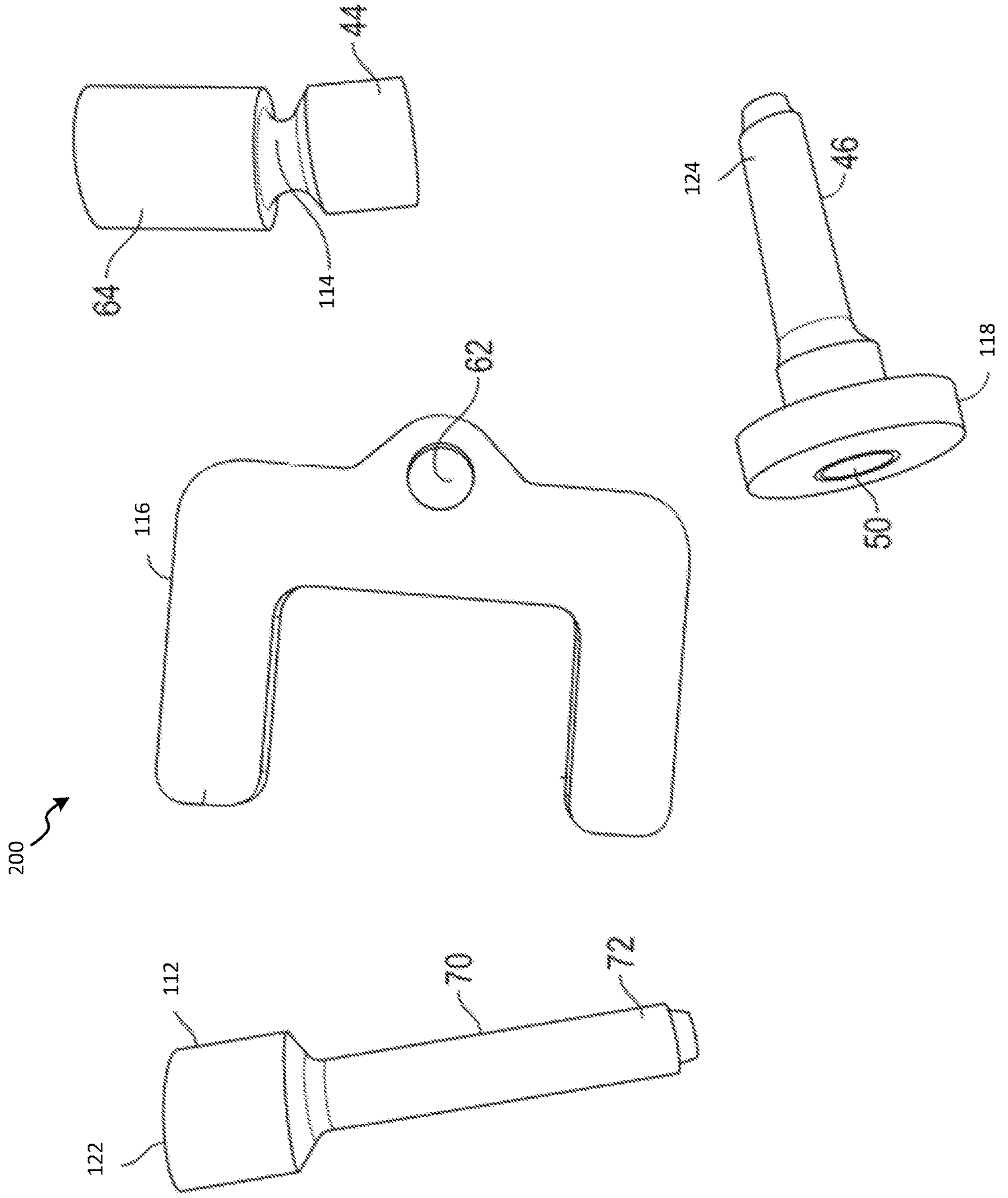
FIGS. 2A and 2B illustrate a specific configuration of a removal tool configured for removing an insertable engine component from a slot of an engine assembly in accordance with embodiments of the present disclosure.
Figure 2B:
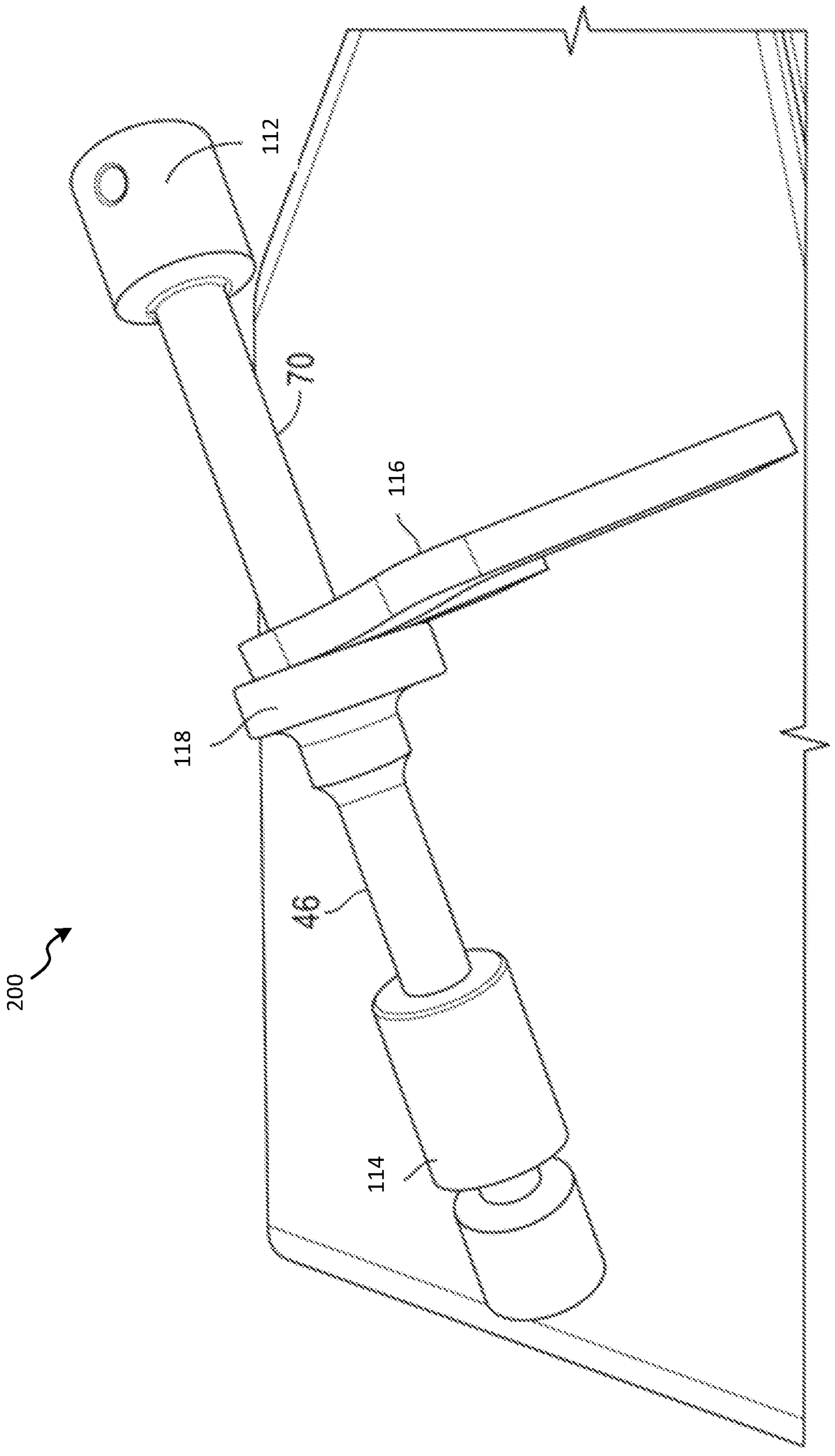

FIGS. 2A and 2B illustrate a specific configuration of a removal tool 200 configured for removing an insertable engine component from a slot of an engine assembly in accordance with embodiments of the present disclosure. In particular, the example illustrated in FIGS. 2A and 2B show a configuration in which the components of removal tool 200 may be made of a non-unitary construction. For example, removal tool 200 may include a main shaft 110 that may be composed of an upper section 70 and a lower section 46. Upper section 70 may include distal end 72 and proximal end 122. Proximal end 122 may be configured to include drive member 112, with functionality as described above with respect to FIG. 1. In this example, upper section 70 and drive member 112 may be constructed of a unitary construction or may be separate components as described above. Distal end 72 of upper section 70 may be configured to attach to proximal end 50 of lower section 46. For example, lower section 46 may include distal end 124 and proximal end 50. Proximal end 50 may be configured to be attached (e.g., via a tenon and mortise system as described above) to distal end 72 of upper section 70 to construct the main shaft of removal tool 200. In embodiments, proximal end 50 of lower section 46 may also include detent member 118, which may include a circular flange configured to support lifting member 116 and to apply the vertical force provided by coupling device 114 against lifting member 116, in accordance with functionality as described above with reference to FIG. 1.

In embodiments, distal end 124 of lower section 46 may be configured to attach (e.g., via a tenon and mortise system as described above) to coupling device 114. Coupling device 114 may include functionality as described above with respect to FIG. 1. In this example, coupling device 114 may include a ball socket and joint that may include a wrench socket 44 configured to be mounted onto the retaining component securing the insertable engine component to be removed, and a ball joint retainer 64 configured to attach to distal end 124 of lower section 46. In embodiments, the ball and joint configuration of coupling device 114 may allow some tolerance in the coupling between lower section 46 and coupling device 114 facilitating the transfer of the rotational force onto the retaining component by providing a level of forgiveness even when the main shaft is not perfectly aligned to the retaining component.

As seen in FIG. 2A, in this example, lifting member 116 may include a lifting plate, which may have a shape configured to facilitate positioning of lifting member 116 around the body of the insertable engine component to be removed, just under the portion against which the lifting force is to be applied, to lift the insertable engine component out of the slot into which the insertable engine component may be installed. In this example, lifting member 116 may include opening 62 configured to allow distal end 72 of upper section 70 to slide into opening 62, and to attach to proximate end 50 of lower section 46. The functionality of opening 62 may include functionality in accordance with the description of the opening with respect to FIG. 1.

In some embodiments, the lifting plate of lifting member 116 may include a U-shaped configured to wrap around the insertable engine component to be removed. In a specific example, the insertable engine component may include a fuel injector and the U-shaped lifting plate may be configured to be positioned around the body of the fuel injector, just under a flange of the fuel injector. As the U-shaped lifting plate pushes the lifting force against the flange, the fuel injector may be pushed upward, and may be pulled from the cylinder head into which the fuel injector may be installed. FIG. 2B, shows a view of a fully assembled removal tool 200 in accordance with embodiments of the present disclosure.

Figure 3A:
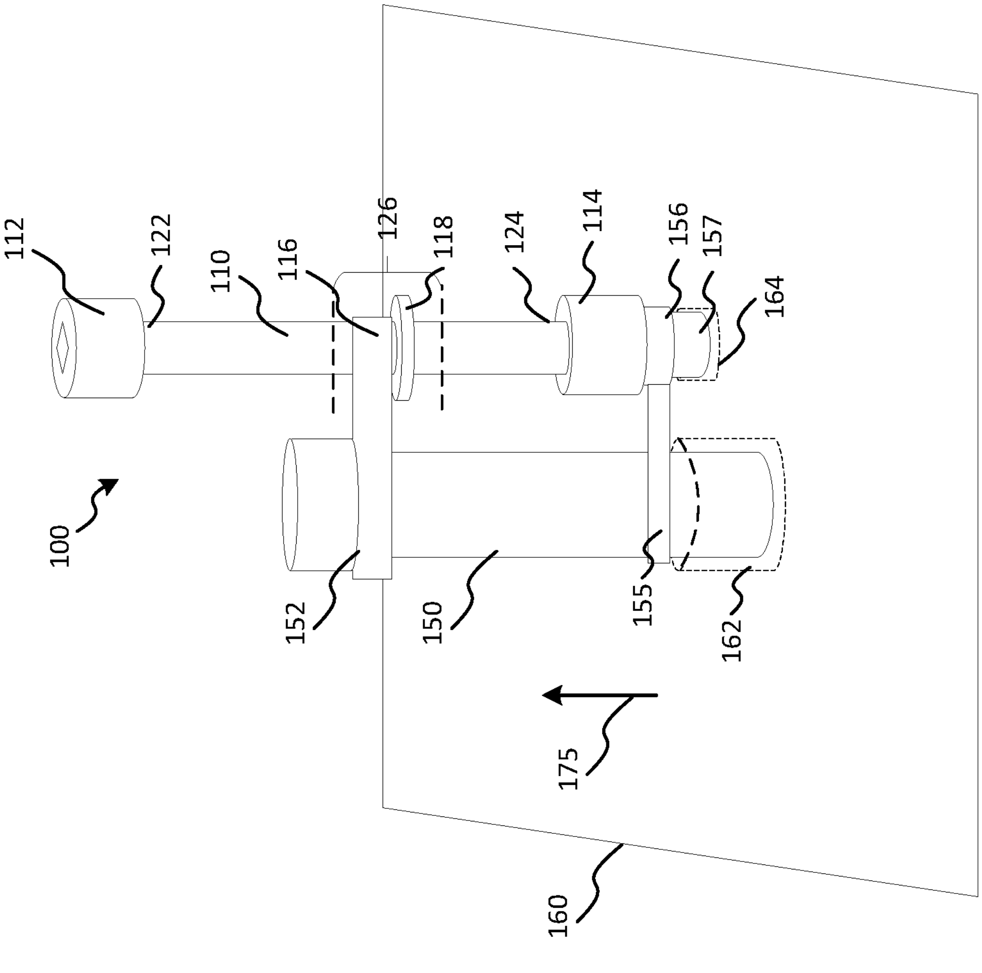
FIGS. 3A-3C show views of a removal tool during operation in accordance with embodiments of the present disclosure.
Figure 3B:
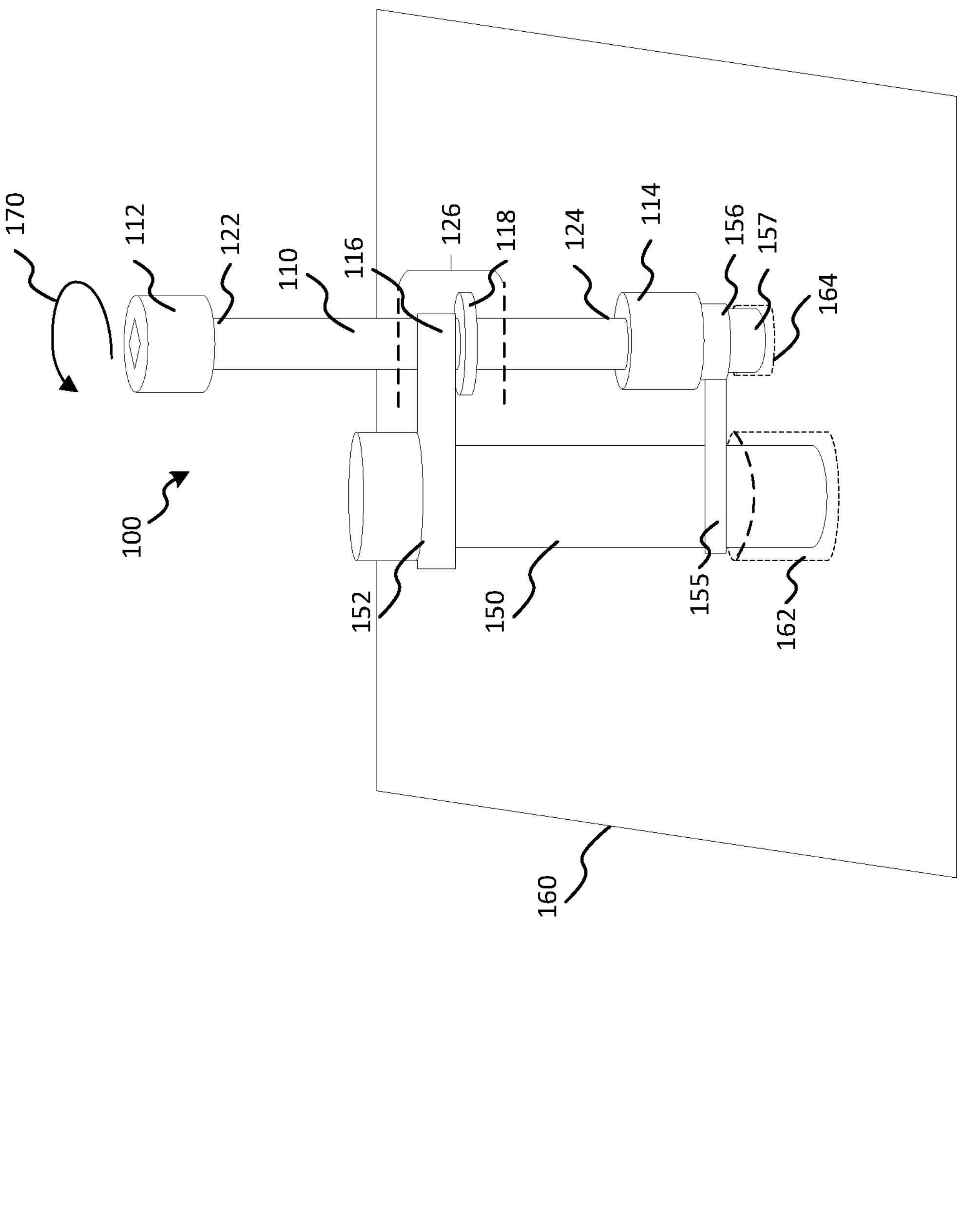
Figure 3C:
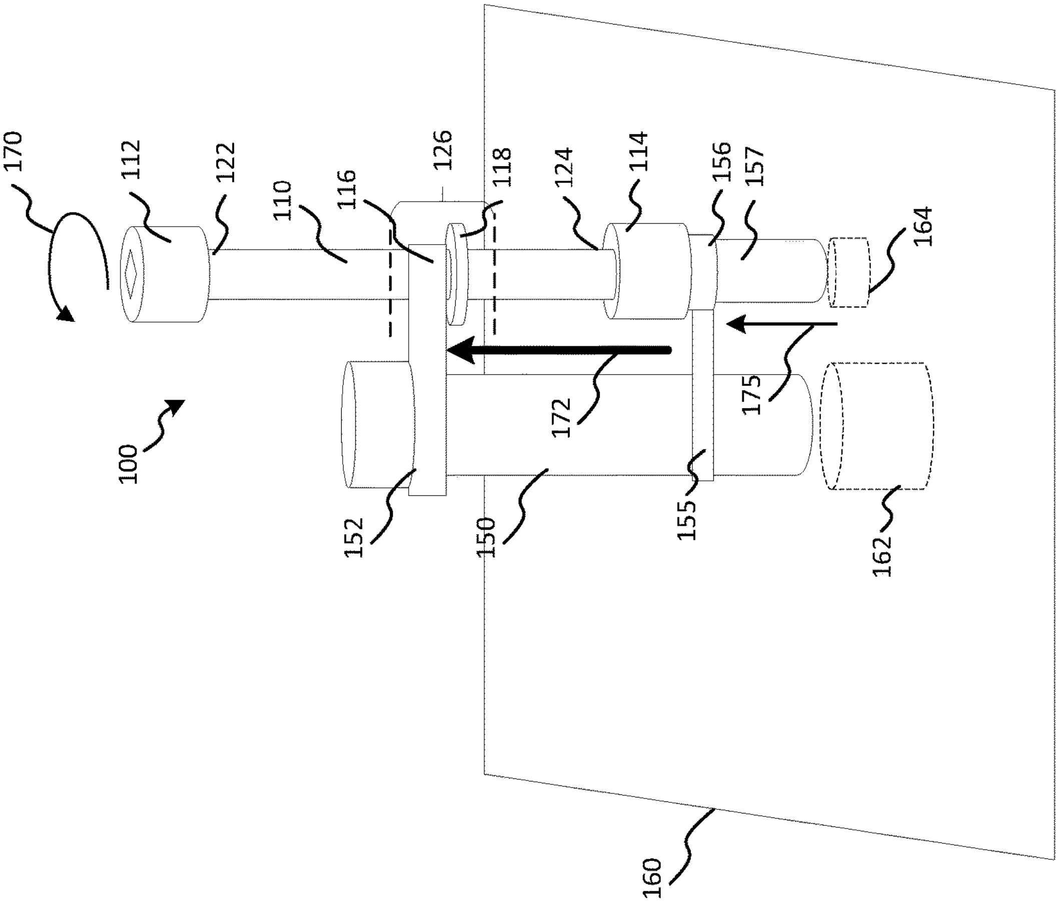
Figure 5:
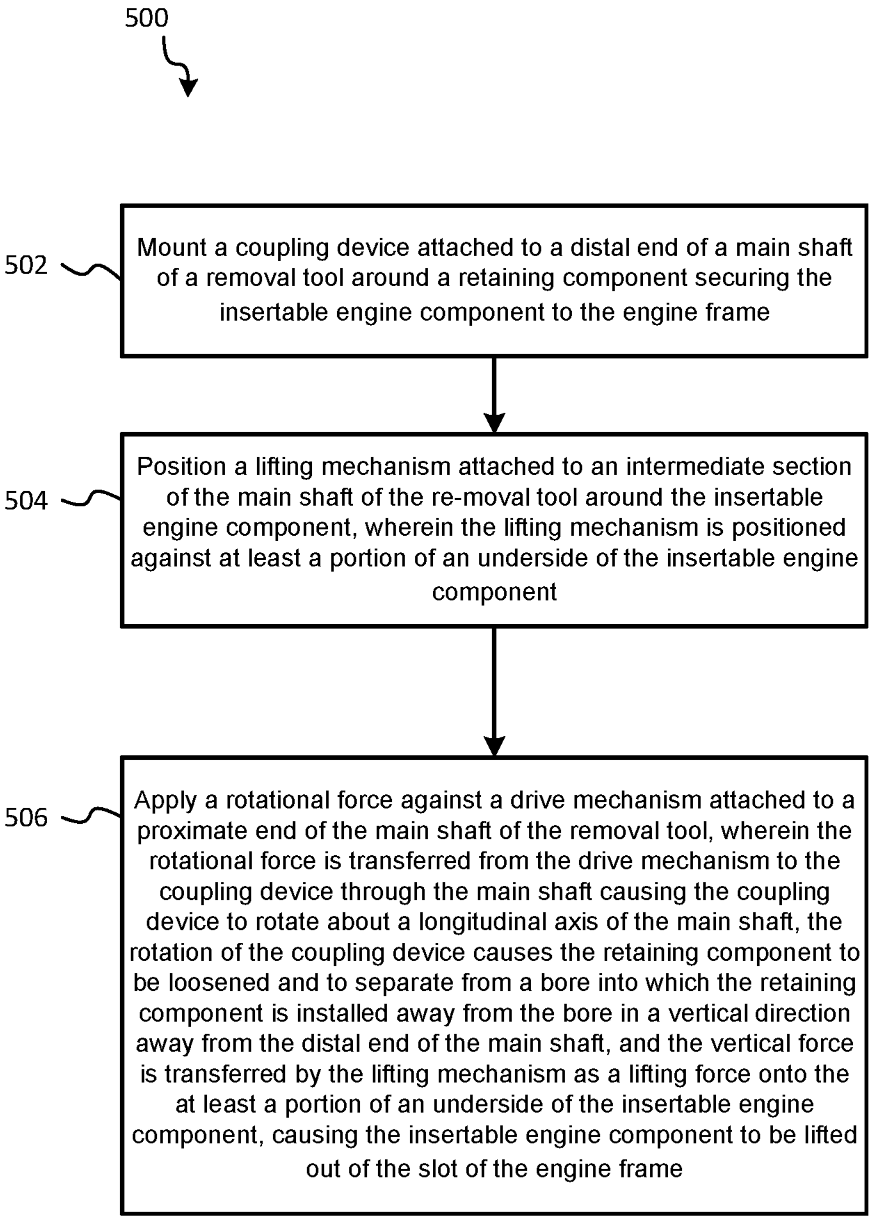
FIG. 5 shows a high-level flow diagram of operation of a removal tool configured in accordance with embodiments of the present disclosure for removing an insertable engine component from a slot of an engine assembly.

Operation of a removal tool configured for removing an insertable engine component from a slot of an engine assembly in accordance with embodiments of the present disclosure will now be discussed with respect to FIG. 5, and with additional reference to FIGS. 3A-3C. FIGS. 3A-3C show views of removal tool 100 during operation in accordance with embodiments of the present disclosure. FIG. 5 shows a high-level flow diagram 500 of operation of a removal tool configured in accordance with embodiments of the present disclosure for removing an insertable engine component from a slot of an engine assembly.

As shown in FIG. 3A, an insertable engine component 150 may be installed into slot 162 of engine frame 160. In this example, insertable engine component 150 may inserted into slot 162. Further in this particular example, insertable engine component 150 may be secured to engine frame 160 using retaining component 157, which may represent a bolt or a screw, and which may have a head 156. In this example, retaining component may be installed into bore 164, which may include a threaded bore. In this example, insertable engine component 150 may be secured to engine frame 160 using clamp 155, which may be coupled to insertable engine component 150 and may be secured to secured to engine frame 160 using retaining component 157. In this manner, clamp 155 is used to secure insertable engine component 150 to engine frame 160.

In this example, insertable engine component 150 may also include flange 152, which may represent a flange on the underside of a portion of insertable engine component 150 and may provide a point at which a lifting force may be applied against the underside of insertable engine component 150 to push insertable engine component 150 along vertical direction 175, which may represent a direction away from engine frame 160. As noted above, the position of retaining component 157 and the available space within the components of engine frame 160 may present a very challenging situation making removal of retaining component 157 and/or insertable engine component 150 difficult and/or dangerous. In this case, it may be decided to remove insertable engine component 150 from engine frame 160 using removal tool 100.

During operation, at block 502 (as shown in FIG. 5), coupling device 114 of removal tool 100 may be mounted around retaining component 157. In embodiments, as described above, coupling device 114 may be configured to be mounted onto head 156 of retaining component 157 in a rotationally fixed manner, such that head 156 may be securely or tightly gripped by coupling device 114. In this manner, as coupling device 114 rotates, retaining component 157 may also rotate in response to the rotation of coupling device 114.

During operation, at block 504 (as shown in FIG. 5), lifting member 116 may be positioned around insertable engine component 150. For example, lifting member 116 may be positioned against the underside or below flange 152. In this manner, a lifting force applied from lifting member 116 against flange 152 may push insertable engine component 150 on the vertical direction 175, pulling insertable engine component 150 away from slot 162.

During operation, at block 506 (as shown in FIG. 5), rotational force 170 (as seen in FIG. 3B) may be applied against drive member 112. For example, an operator may manually or using a tool installed onto drive member 112 may cause drive member to rotate. Rotational force 170 applied to drive member 112 may be transferred to main shaft 110, causing main shaft 110 to rotate about a longitudinal axis of main shaft 110. Rotational force 170 may be further transferred through main shaft 110 onto coupling device 114, causing coupling device 114 to also rotate in the direction of rotational force 170, which may include a direction about the longitudinal axis of main shaft 110. As coupling device 114 is mounted onto head 156 of retaining component 157 at this point, rotational force 170 may be transferred to retaining component 157 causing retaining component 157 to rotate in the direction of rotational force 170.

In embodiments, as illustrated in FIG. 3C, the rotation of retaining component 157 may cause retaining component 157 to be unscrewed or loosened from threaded bore 164. As retaining component 157 is unscrewed from bore 164 by rotational force 170, retaining component 157 may separate from bore 164 in an upward vertical direction 175, which is a direction away from the engine frame 160 and along the longitudinal axis of main shaft 110. In embodiments, the separation of retaining component 157 in vertical direction 175 causes coupling device 114 to experience a lifting force 172 in the direction of vertical direction 175, which may cause coupling device 114 to be pushed in the direction of lifting force 172. As coupling device 114 is attached to main shaft 110, lifting force 172 is transferred to main shaft 110, causing main shaft 110 to be pushed in the direction of lifting force 172. Main shaft may transfer, through detent member 118, lifting force 172 onto lifting member 116, as detent member may exert the lifting force against lifting member 116, and this may cause lifting member 116 to be pushed in the direction of lifting force 172.

In embodiments, as lifting member 116 is positioned against the underside of flange 152, lifting force 172 may be transferred by lifting member 116 onto the underside of flange 152. This may cause insertable engine component 150 to be pushed in the direction of lifting force 172. As the direction of lifting force 172 is away from engine frame 160, the lifting force 172 may cause insertable engine component 150 to be extracted or pulled from slot 162. In this manner, insertable engine component 150 may be removed from slot 162 concurrently with the removal of retaining component 164. This may be, in some embodiments, characterized as a single-step operation, as the operator, after installation of removal tool 152 onto the operational environment (e.g., after mounting the coupling device around retaining component 157 and positioning lifting member 116 around insertable engine component 150 and against the underside of flange 152), the operator may remove insertable engine component 150 by simply rotating drive member 112, which may cause retaining component 157 to me removed from bore 164 and insertable engine component 150 to be extracted from slot 162 by the single step of rotating drive member 112.

Figure 4A:
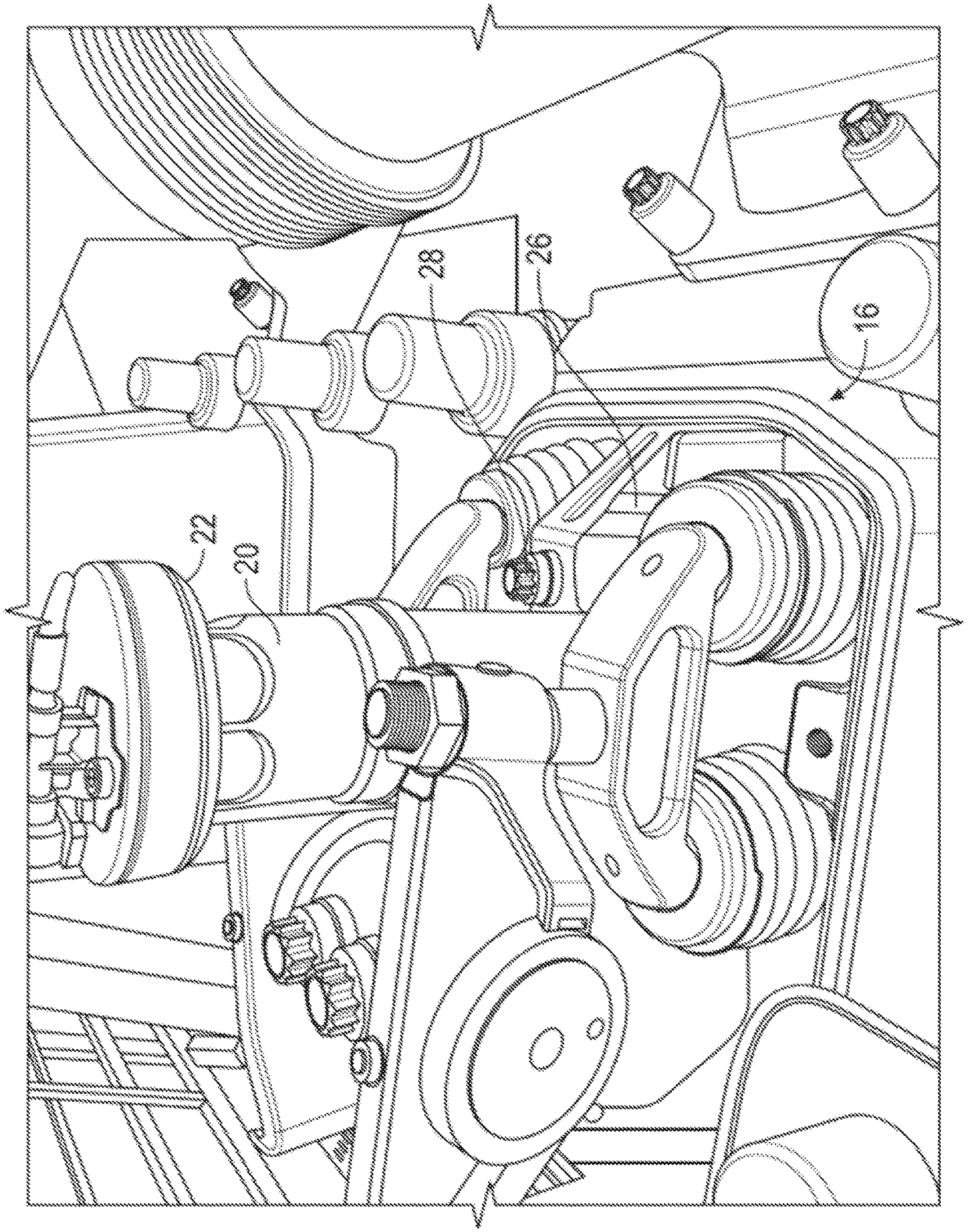
FIGS. 4A and 4B show a particular example of operations of a removal tool configured for removing an insertable engine component from a slot of an engine assembly in accordance with embodiments of the present disclosure.
Figure 4B:
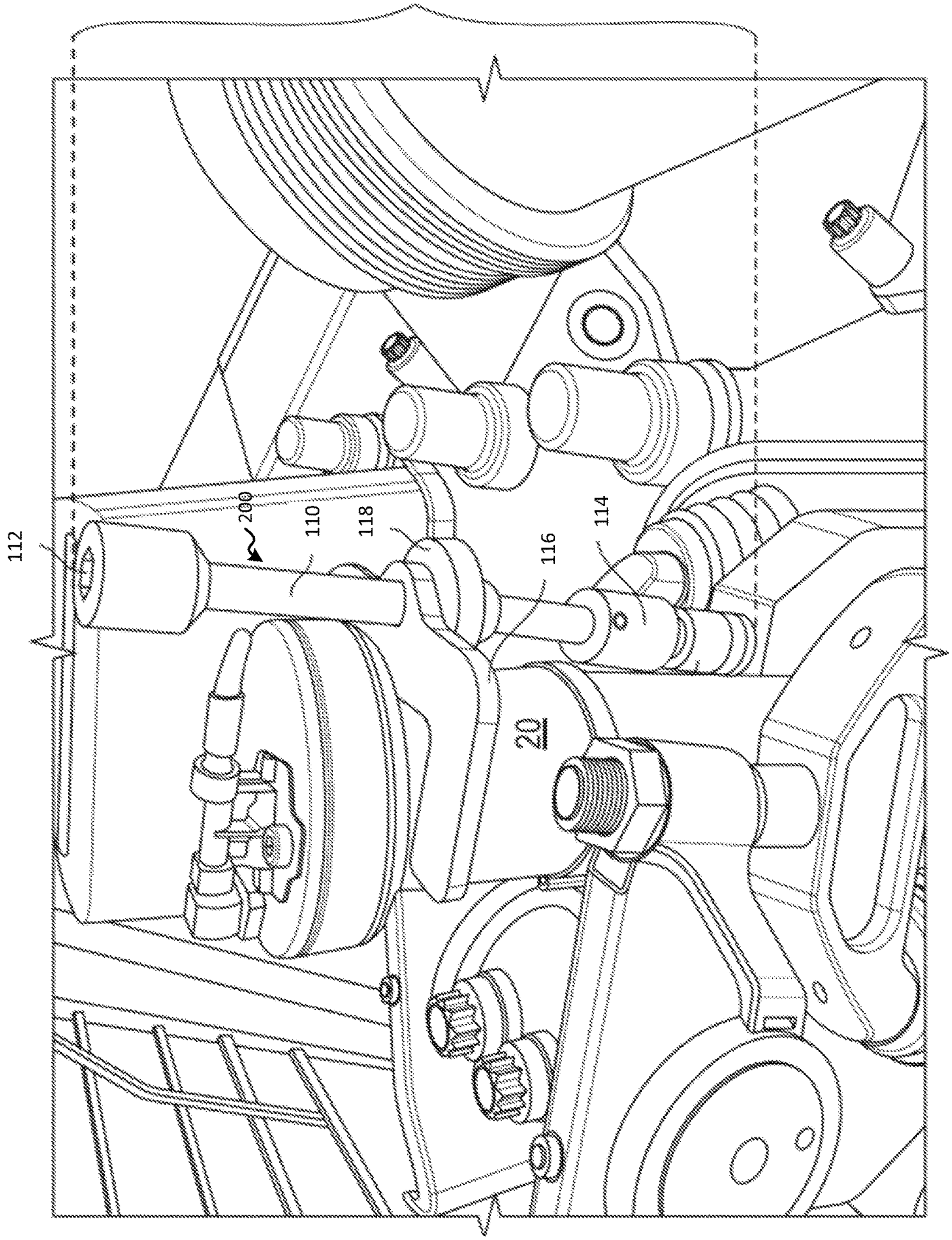

FIGS. 4A and 4B show a particular example of operations of removal tool 200 configured for removing an insertable engine component from a slot of an engine assembly in accordance with embodiments of the present disclosure. In the example illustrated in FIGS. 4A and 4B, removal tool 200 may include removal tool 200 as described with respect to FIGS. 2A and 2B.

As shown in FIGS. 4A and 4B, a fuel injector 20 may be installed on a cylinder head of a locomotive engine 16. In this example, fuel injector 20 may be secured to locomotive engine 16 using a clamp 26 secured to locomotive engine 16 by clamp bolt 28. In this particular example, fuel injector 20 may include flange 22.

During operation, coupling device 114 may be mounted around clamp bolt 28 in a rotationally fixed manner, such that clamp bolt 28 may be securely or tightly gripped by coupling device 114. In this manner, as coupling device 114 rotates, clamp bolt 28 may also rotate in response to the rotation of coupling device 114.

During operation, lifting member 116 may be positioned around insertable fuel injector 20. For example, lifting member 116 may be positioned against the underside or below flange 22. In this manner, a lifting force applied from lifting member 116 against flange 22 may push fuel injector 20 upward and may pulling fuel injector 20 away from slot the cylinder head into which fuel injector 20 may be installed.

During operation, a rotational force may be applied against drive member 112, which may be transferred through main shaft 110 onto coupling device 114, causing coupling device 114 to rotate about a longitudinal axis of main shaft 110. As coupling device 114 is mounted onto clamp bolt 28 at this point, the rotational force may be transferred to clamp bolt 28 causing clamp bolt 28 to rotate in the direction of the rotational force about a longitudinal axis of main shaft 110. In this example, the rotation of clamp bolt 28 may cause clamp bolt 28 to be unscrewed from its threaded bore. As clamp bolt 28 is unscrewed by the operation of the rotational force, clamp bolt 28 may separate from its threaded bore in an upward vertical direction away from locomotive engine 16 and along the longitudinal axis of main shaft 110. The separation of clamp bolt 28 in the vertical direction may cause coupling device 114 to experience a lifting force in the direction of the vertical direction, which may cause coupling device 114 to be pushed in the direction of the lifting force. The lifting force may be transferred through main shaft 110, via detent member 118, onto lifting member 116, as detent member 118 may exert the lifting force against lifting member 116, and this may cause lifting member 116 to be pushed in the direction of the lifting force.

In this example, the lifting force may be transferred by lifting member 116 onto the underside of flange 22, causing fuel injector 20 to be pushed in the direction of the lifting force. As the direction of the lifting force is away from locomotive engine 16, the lifting force may cause fuel injector 20 to be extracted or pulled from the cylinder head into which fuel injector 20 may be installed. In this manner, fuel injector 20 may be removed from the respective cylinder head of locomotive engine 16 concurrently with the removal of clamp bolt 28.

Figure 6:
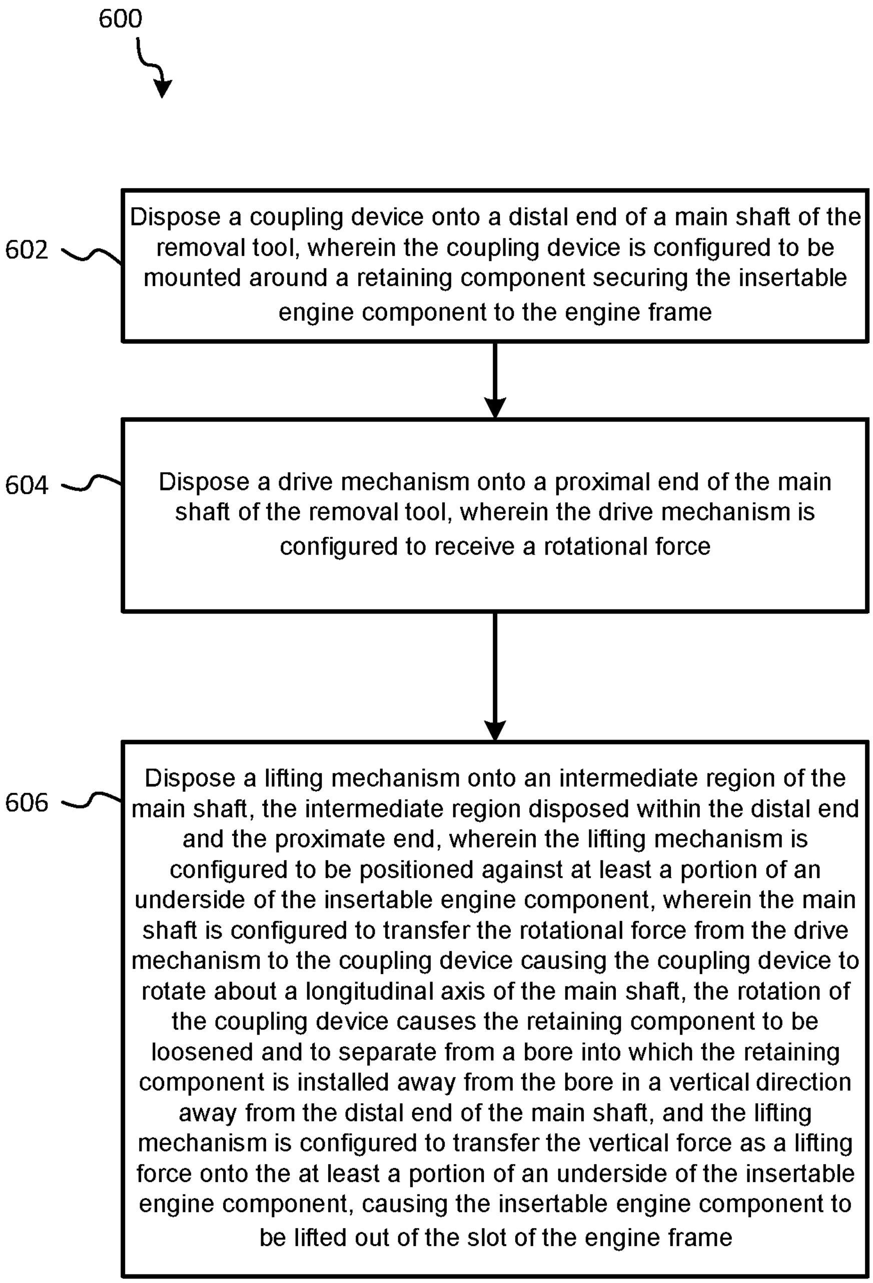
FIG. 6 shows an exemplary flow diagram of operations for manufacturing a removal tool configured with functionality for an insertable engine component from a slot of an engine assembly in accordance with embodiments of the present disclosure.

A method of manufacturing a removal tool configured for removing an insertable engine component from a slot of an engine assembly in accordance with embodiments of the present disclosure will now be discussed with respect to FIG. 6. FIG. 6 shows an exemplary flow diagram 600 of operations for manufacturing a removal tool configured with functionality for an insertable engine component from a slot of an engine assembly in accordance with embodiments of the present disclosure. For example, the steps illustrated in the example blocks shown in FIG. 6 may be performed to manufacture removal tool 100 and/or removal tool 200 of FIGS. 1-5, according to embodiments herein.

At block 602, a coupling device may be disposed onto a distal end of a main shaft of the removal tool. In embodiments, the coupling device may be configured to be mounted around a retaining component securing the insertable engine component to the engine frame. For example, a coupling device (e.g., coupling device 114 as illustrated in FIGS. 1-5) may be disposed onto a distal end of a main shaft (e.g., main shaft 110 as illustrated in FIGS. 1-5) of a removal tool (e.g., removal tool 100 and/or removal tool 200, as illustrated in FIGS. 1-5).

At block 604, a drive member may be disposed onto a proximal end of the main shaft of the removal tool. In embodiments, the drive member may be configured to receive a rotational force. For example, a drive member (e.g., drive member 112, as illustrated in FIGS. 1-5) may be disposed onto a distal end of a main shaft (e.g., main shaft 110 as illustrated in FIGS. 1-5) of a removal tool (e.g., removal tool 100 and/or removal tool 200, as illustrated in FIGS. 1-5).

At block 606, a lifting member may be disposed onto an intermediate region of the main shaft. In embodiments, the intermediate region may be disposed within the distal end and the proximate end, and the lifting member may be configured to be positioned against at least a portion of an underside of the insertable engine component. For example, a lifting member (e.g., lifting member 116, as illustrated in FIGS. 1-5) may be disposed onto an intermediate region of a main shaft (e.g., main shaft 110 as illustrated in FIGS. 1-5) of a removal tool (e.g., removal tool 100 and/or removal tool 200, as illustrated in FIGS. 1-5).

In embodiments, the main shaft may be configured to transfer the rotational force from the drive member to the coupling device causing the coupling device to rotate about a longitudinal axis of the main shaft. In embodiments, the rotation of the coupling device may cause the retaining component to be loosened and to separate from a bore into which the retaining component is installed away from the bore in a vertical direction away from the distal end of the main shaft. In embodiments, the lifting member may be configured to transfer the vertical force as a lifting force onto the at least a portion of an underside of the insertable engine component, causing the insertable engine component to be lifted out of the slot of the engine frame.

It will be appreciated that the engine component removal tool can thus be configured to remove a fuel injector clamp bolt and can withdraw a fuel injector from its seat in one single, simultaneous operation. This novel engine component removal tool can provide several advantages, not heretofore available, such as (1) minimizing the exertion required to use the fuel injector removal tool; (2) limiting exposure to the risk of "line of fire release;" (3) minimizing the effects of pinch points; (4) the low cost and simplicity of a single, compact tool that is easy to use; and (5) the ability to loosen and remove a fuel injector assembly in one simultaneous operation.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "member," "module," "device," "unit," "component," "element," "mechanism," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A removal tool for removing an insertable engine component from a slot of an engine frame, comprising:

a main shaft having a distal end, a proximate end, and an intermediate section;

a coupling device coupled to the distal end of the main shaft, wherein the coupling device is configured to be coupled to a retaining component securing the insertable engine component to the engine frame;

a drive member coupled to the proximal end of the main shaft, wherein the drive member is configured to receive a rotational force;

a lifting member directly attached to the intermediate section of the main shaft, wherein the lifting member is configured to be releasably coupled to at least a portion of the insertable engine component, wherein the main shaft is configured to transfer the rotational force from the drive member to the coupling device to cause the retaining component to rotate about a longitudinal axis of the main shaft and to move in a vertical direction applying an upward force against the main shaft; and a detent member in direct contact with the intermediate section and configured to:

resist, via the direct contact with the intermediate section, a sliding movement of the lifting member in a downward direction along the longitudinal axis of the main shaft; and receive the upward force from the main shaft and to move in the upward direction in response to the upward force to lift the insertable engine component out of the engine frame, wherein the main shaft, the lifting member, and the detent member concurrently move in the vertical direction in response to the upward force applied against the main shaft without the main shaft passing through the detent member.

2. The removal tool of claim 1, wherein the insertable engine component includes a fuel injector installed in a cylinder head of a locomotive engine.

3. The removal tool of claim 1, wherein the main shaft is of a unitary construction including the distal end, the proximate end, and the intermediate section disposed within the distal end and the proximate end.

4. The removal tool of claim 1, wherein the main shaft is composed of separate components, wherein the separate components include an upper section and a lower section.

5. The removal tool of claim 4, wherein the upper section includes the drive member and a distal end configured to be coupled to a proximate end of the lower section.

6. The removal tool of claim 4, wherein the lower section includes the coupling device and a proximal end configured to be coupled to a distal end of the upper section.

7. The removal tool of claim 1, wherein the lifting member includes an opening configured to receive the main shaft and configured to enable the lifting member to slide along a longitudinal axis of the main shaft and to freely rotate about the longitudinal axis of the main shaft.

8. The removal tool of claim 1, wherein the retaining component is loosened and separated from the bore concurrently with the lifting of the insertable engine component out of the slot of the engine frame in response to the rotational force applied to the drive member, representing a single-step operation to remove the retaining component and the insertable engine component.

9. A vehicle engine component removal tool, comprising:

a main shaft having a first and second end;

a coupling device coupled to a first end of the main shaft, wherein the coupling device is configured to releasably engage a retaining component operably coupled to an engine frame;

a lifting member directly attached to a portion of the main shaft, wherein the lifting member is configured to receive at least a portion of an insertable engine component;

a drive member coupled to the proximal end of the main shaft, wherein the drive member is configured to receive a rotational force to withdraw the retaining component from the engine frame while withdrawing the insertable engine component from an engine, by operation of an upward force applied against the main shaft by the retaining component; and a detent member in direct contact with an intermediate section and configured to:

resist a sliding movement of the lifting member in a downward direction along the longitudinal axis of the main shaft; and receive the upward force from the main shaft and to move in the upward direction in response to the upward force to withdraw the insertable engine component from the engine, wherein the main shaft, the lifting member, and the detent member concurrently move in the vertical direction in response to the upward force applied against the main shaft without the main shaft passing through the detent member.

10. The removal tool of claim 9, wherein the insertable engine component includes a fuel injector installed in a cylinder head of a locomotive engine.

11. The removal tool of claim 9, wherein the main shaft is of a unitary construction.

12. The removal tool of claim 9, wherein the main shaft is composed of separate components, wherein the separate components include an upper section, a lower section, and an intermediate section coupled to the upper section and the lower section.

13. The removal tool of claim 12, wherein the upper section includes the drive member and a distal end configured to be coupled to a proximate end of the lower section.

14. The removal tool of claim 12, wherein the lower section includes the coupling device and a proximal end configured to be coupled to a distal end of the upper section.

15. The removal tool of claim 9, wherein the lifting member includes an opening configured to receive the main shaft and configured to enable the lifting member to travel along a longitudinal axis of the main shaft and to freely rotate about the longitudinal axis of the main shaft.

16. The vehicle removal tool of claim 9, wherein the retaining component is loosened and separated from the engine frame concurrently with the lifting of the insertable engine component out of the slot of the engine frame in response to the rotational force applied to the drive member, representing a single-step operation to remove the retaining component and the insertable engine component.

17. The vehicle removal tool of claim 9, wherein the vehicle removal tool is configured to remove the insertable engine component from a slot of an engine frame.

* * * * *